United States Patent [19]
Kirkpatrick

[11] Patent Number: 5,377,909
[45] Date of Patent: Jan. 3, 1995

[54] LIMIT SWITCH CONTROL ESPECIALLY FOR WARM AIR FURNACES

[75] Inventor: Michael E. Kirkpatrick, West Lafayette, Ind.

[73] Assignee: Consolidated Industries Corp., Lafayette, Ind.

[21] Appl. No.: 165,354

[22] Filed: Dec. 10, 1993

[51] Int. Cl.⁶ .............................................. F23N 5/20
[52] U.S. Cl. ..................... 236/11; 236/46 E
[58] Field of Search ............ 236/11, 10, 9 R, 9 A, 236/46 R, 46 E, 15 R, 15 BG, 15 BR, 94; 431/23, 68

[56] References Cited

U.S. PATENT DOCUMENTS

| | | |
|---|---|---|
| 3,549,088 | 12/1970 | Obenhaus . |
| 3,921,899 | 11/1975 | Hamilton . |
| 4,140,274 | 2/1979 | Nabinger . |
| 4,408,711 | 10/1983 | Levine . |
| 4,502,625 | 3/1985 | Mueller . |
| 4,638,942 | 1/1987 | Ballard . |
| 4,667,874 | 5/1987 | Johnson et al. . |
| 4,792,089 | 12/1988 | Ballard . |
| 4,815,524 | 3/1989 | Dempsey et al. . |
| 4,887,767 | 12/1989 | Thompson et al. ............ 236/9 R X |
| 4,951,870 | 8/1990 | Ballard . |
| 5,197,664 | 3/1993 | Lynch .................................. 236/11 |

FOREIGN PATENT DOCUMENTS 7907138  3/1981  Netherlands .

*Primary Examiner*—Harry B. Tanner
*Attorney, Agent, or Firm*—Victor E. Libert; Frederick A. Spaeth

[57] ABSTRACT

A control system to control the operation of a furnace (10) having a fuel control unit (26) to supply fuel to a burner (24) includes a limit switch (48) within furnace (10) to detect an overheated condition. The limit switch (48) opens when a reference temperature is reached, shutting down the furnace (10). A logic unit (40) senses the state of the limit switch (48) and measures the shutdown period, and notes whether the shutdown period exceeds a predetermined interval. The logic unit (40) opens a lockout switch (38') that controls the fuel control unit (26) if the furnace is subject to a number of consecutive prolonged shutdowns that exceeds a predetermined limit.

11 Claims, 2 Drawing Sheets

LIMIT SWITCH CONTROL ESPECIALLY FOR WARM AIR FURNACES

BACKGROUND OF THE INVENTION

1. Field of the Invention

This invention relates to heating system furnaces of the type used for heating buildings and homes, and more particularly, to a control system and method for ensuring safe operation of the furnace and for protecting the furnace in the event of a circulating air blower failure or severe air flow restriction.

2. Background of the Invention

Conventional forced air heating system furnaces, such as those commonly installed in homes, typically use a means for moving air, such as a circulating air blower, along an air flow path through a chamber embodying a heat exchanger. The circulating air blower, which is operated by a drive motor, forces air past the coils of the heat exchanger to heat the air, and then directs the heated air through outlet ducts into the space to be heated. Heat is supplied to the heat exchanger by combustion product gases entering the heat exchanger coils from a fuel burner controlled by a fuel valve. The relative positioning of the circulating air blower, drive motor and furnace heat exchanger can provide a categorization of these heating system furnaces as being "downflow" furnaces, wherein the circulating air blower and its drive motor are located above the heat exchange:; as "horizontal" furnaces, wherein the air blower and its drive motor are located to one side of the heat exchanger; or as "upflow" furnaces, wherein the air blower and the drive motor are located below the heat exchanger.

Unfortunately, in forced air heating system furnaces, circumstances can arise that will bring about overheating conditions in the enclosure housing of the furnace. If insufficient air is being delivered by the circulating air blower to the furnace chamber containing the heat exchanger, an overheated and unsafe condition can result while the fuel burner is actively combusting fuel. A similar condition will arise if the circulating air blower ceases to function properly or completely shuts down. This problem is particularly pronounced in the "horizontal" and "downflow" forced air furnaces because the heated air from the heat exchanger coils will heat the air surrounding the circulating air blower, the drive motor and the furnace filter. The resulting overheated condition arises as a consequence of the lack of air flow in the enclosure housing and the consequential inability to remove the heat generated from the burner.

Air flow through the furnace can become inadequate as the result of a variety of factors, such as a malfunctioning air blower or an obstruction of the air path, e.g., a clogged air filter or a blockage of either the input or output air ducts of the furnace. Because the possibility exists for a low or no air flow condition to occur in the furnace, various building codes have been implemented to provide safety standards to preclude an overheated condition of the furnace by stopping the flow of fuel to the burner to contain internal furnace temperatures within prescribed limits. These temperature limits are required not only to meet safety standards, but also to minimize damage to the air filter and/or other temperature sensitive parts of the furnace. An example of a test furnace designed to enforce such standards is detailed by ANSI standard Z21.47a, which is incorporated herein by reference in its entirety.

To maintain the prescribed safety temperature limits during a malfunction, it is known, as described by Z21.47a standard, to stop the flow of fuel to the burner during an overheating condition based on information provided by a temperature sensing switch. The temperature limit switch opens itself or switches to the OFF position to interrupt the flow of fuel to the furnace when the temperature of the air leaving the furnace exceeds a preset temperature of about 185° F. and resets itself or switches to the ON position when the temperature of the air leaving the furnace falls below about 185° F. This limit switch is called a "primary limit switch". The primary limit switch will self-reset to ON when the temperature drops below about 185° F.

In addition, for a furnace for installation in the horizontal position or downflow position, in the event of a failed circulating air blower, a temperature limit switch must open to interrupt the flow of fuel to the furnace to prevent air temperatures at the inlet of the furnace (1) from exceeding 175° F. above the ambient temperature prior to or during the first five cycles of the limit switch and (2) from exceeding 90° F. above the ambient temperature on the sixth and subsequent cycles of the limit switch. A second temperature limit switch called an "auxiliary limit" may or may not be required to perform this function. The auxiliary limit switch may be of the manual reset type, typically reset by service personnel, after inspecting the furnace for and repairing any damage causing the loss of circulating airflow.

A fuel valve responsive to the state of the primary limit switch and the auxiliary limit switch stops fuel flow to the furnace when either of the switches are in the OFF condition. When both switches are ON, fuel flow is allowed to be restored to the fuel burner in the furnace. Fuel may then enter the furnace to be combusted in response to a demand signal from a thermostat external to the furnace. Conversely, when either switch is in the OFF position, indicating internal furnace temperatures in excess of the maximum allowable temperatures, fuel flow to the fuel burner is discontinued and signals from the thermostat for heat are ignored. In this manner, fuel will be prevented from entering the fuel burner when the internal furnace temperature rises above maximum allowable temperatures.

Requiring two switches for the operation of a heating control system in a forced air furnace, however, presents several disadvantages. For example, the operation of the second "lockout" switch may necessitate a service call whenever false alarms, not related to furnace operation, improperly trigger the switch and thereby preclude fuel flow. False alarms may arise due to power failures. The false activation of this switch adds considerably to the cost of ownership of the furnace because of the required service call.

Other disadvantages inherent in the presence of a second switch are the cost of the switch and its installation with associated circuitry, and the reduced reliability of the furnace. Reliability is reduced because the second switch increases the number of parts required for the operation of the furnace, thereby increasing the possibility of failure. In effect, the presence of the second "lockout" switch reduces overall reliability of the furnace.

Various attempts have been made to address the foregoing problems, including the employment of a microprocessor to control furnace operation in response to overtemperature conditions. For example, U.S. Pat. No. 4,951,870 issued to Ballard et al. on Aug. 28, 1990, discloses an apparatus and control method for responding to furnace overtemperature conditions wherein a microprocessor is used to count the number of occurrences of automatic resets encountered by an auxiliary limit switch that opens in response to overtemperature conditions resulting from a failure of the blower motor. When the number reaches a predetermined level, the furnace system is caused to lockout.

U.S. Pat. No. 4,502,625 issued to Mueller on Mar. 5, 1985 discloses a furnace control apparatus for a downflow forced air furnace having a microprocessor and thermostat to initiate and control the flow of gas to the burner for the start-up of the furnace. A fuel control means is provided for turning off the fuel supplied to the furnace when the temperature of the heating air remains below a predetermined reference temperature within a preset time following the start of the operation of the air circulator. The microprocessor is substituted for two temperature limit switches by a program for controlling the gas valve for stopping gas flow to the burner if the temperature of the air exiting the compartment of the heat exchanger exceeds a predetermined temperature stored in the microprocessor memory (in the event of a restriction to the air entering the furnace) or is below a predetermined temperature by a preset amount (in the event of a circulator failure).

SUMMARY OF THE INVENTION

The present invention relates to a control system for a heating furnace of the type comprising an enclosure housing defining an air path, a blower for forcing air to be heated through the air path, a heat exchanger in the air path, a burner for combusting fuel to supply heat to the heat exchanger and a fuel control unit for controlling the flow of fuel to the burner. The improvement provides a primary limit switch in the enclosure housing having a closed or ON state for allowing the furnace to operate and an open or OFF state for shutting down the furnace for a shutdown period, and being normally ON and being capable of switching from ON to OFF when the temperature in the enclosure housing exceeds a predetermined level. In one embodiment of the invention, the control system comprises a timer control means responsive to the limit switch. The timer control means comprises a timer for measuring the shutdown period and for comparing the shutdown period to a predetermined reference interval. The timer control means opens at least one lockout switch for locking out the operation of the furnace if the shutdown period exceeds the reference interval. Preferably, at least the fuel control unit is not operable when the at least one lockout switch is open. Optionally, the timer control means may be electrically powered and may comprise a power on-reset means so that the timer is reset to zero when the power to the timer control means is shut off and then restored.

In an alternative embodiment of the invention, the control system comprises an electrically powered logic control means responsive to the primary limit switch. The logic control means comprises a timer means for measuring the shutdown period and for comparing the shutdown period to a predetermined reference interval. The logic control means further comprises counting means for counting the number of consecutive prolonged shutdown cycles and for comparing the counted number to a predetermined cycle count limit, and for opening at least one lockout switch for locking out the operation of the furnace if the counted number reaches the predetermined cycle count limit. In accordance with the present invention at least the fuel control unit is not operable when the at least one lockout switch in open. Preferably, the limit switch is located on or near the heat exchanger.

According to one aspect of the invention, the logic means may comprise a microprocessor, which may be equipped with a power on-reset means so that the timing means and the counting means are reset to zero when the power to the logic control means is shut off and then restored. The logic means may further comprise memory means for storing the predetermined reference interval and the predetermined cycle count limit.

The present invention also provides a method for limiting the operation of a furnace of the type described above, the operation of which includes responding to a demand signal from an external thermostat by running a draft inducer for the heat exchanger, supplying fuel to the burner via the fuel control unit, operating the burner to heat the heat exchanger and running the blower means to blow air to be heated over the heat exchanger. The method for limiting the operation comprises the steps of: a) shutting down the furnace when the temperature of the air near the heat exchanger exceeds a reference temperature; b)(i) measuring the shutdown period, and (ii) comparing the shutdown period to a predetermined reference interval; and c) locking out the operation of the furnace if the shutdown period is prolonged with respect to the reference interval, i.e., if it exceeds the predetermined reference interval.

In an alternative method embodiment of the present invention, after the shutdown period is compared to the predetermined reference interval in step (b)(ii), the method may comprise: c) either (i) locking out the operation of the furnace if the shutdown period is prolonged with respect to the reference interval, i.e., if the shutdown period exceeds the reference interval, and if the furnace has attained a predetermined cycle count limit of consecutive prolonged shutdown periods, or (ii) allowing the furnace to resume operation when the temperature of the air near the heat exchanger falls below the reference temperature, and incrementing a counter if the shutdown period was prolonged or re-starting the counter if the shutdown period was short. Preferably, steps (b) and (c) are accomplished by means of a microprocessor. Preferably, step (a) comprises measuring the temperature at a location in close proximity to the heat exchanger.

DESCRIPTION OF THE PREFERRED EMBODIMENT

The present invention provides a system for the control of fuel to a heating furnace for avoiding an overtemperature condition sensed by a single temperature-sensitive limit switch without the need of an auxiliary limit switch. This is accomplished by the use of a logic means for measuring the duration of time that the limit switch shuts down the furnace and comparing the measured shutdown period to a predetermined reference interval, and by counting the number of consecutive shutdowns that exceed the reference shutdown time, i.e., the number of consecutive prolonged shutdowns. If the number of consecutive prolonged shutdowns reaches a predetermined cycle count limit, the logic means will lockout the furnace fuel control assembly to shut down the furnace until it can be serviced. Not only is the need for an auxiliary limit switch eliminated, but the overall design of the furnace becomes simplified due to the obviated circuitry that is normally associated with an auxiliary limit switch, and also due to there being fewer moving parts in the furnace system. System reliability is thereby enhanced at a lower cost.

Figure 1:
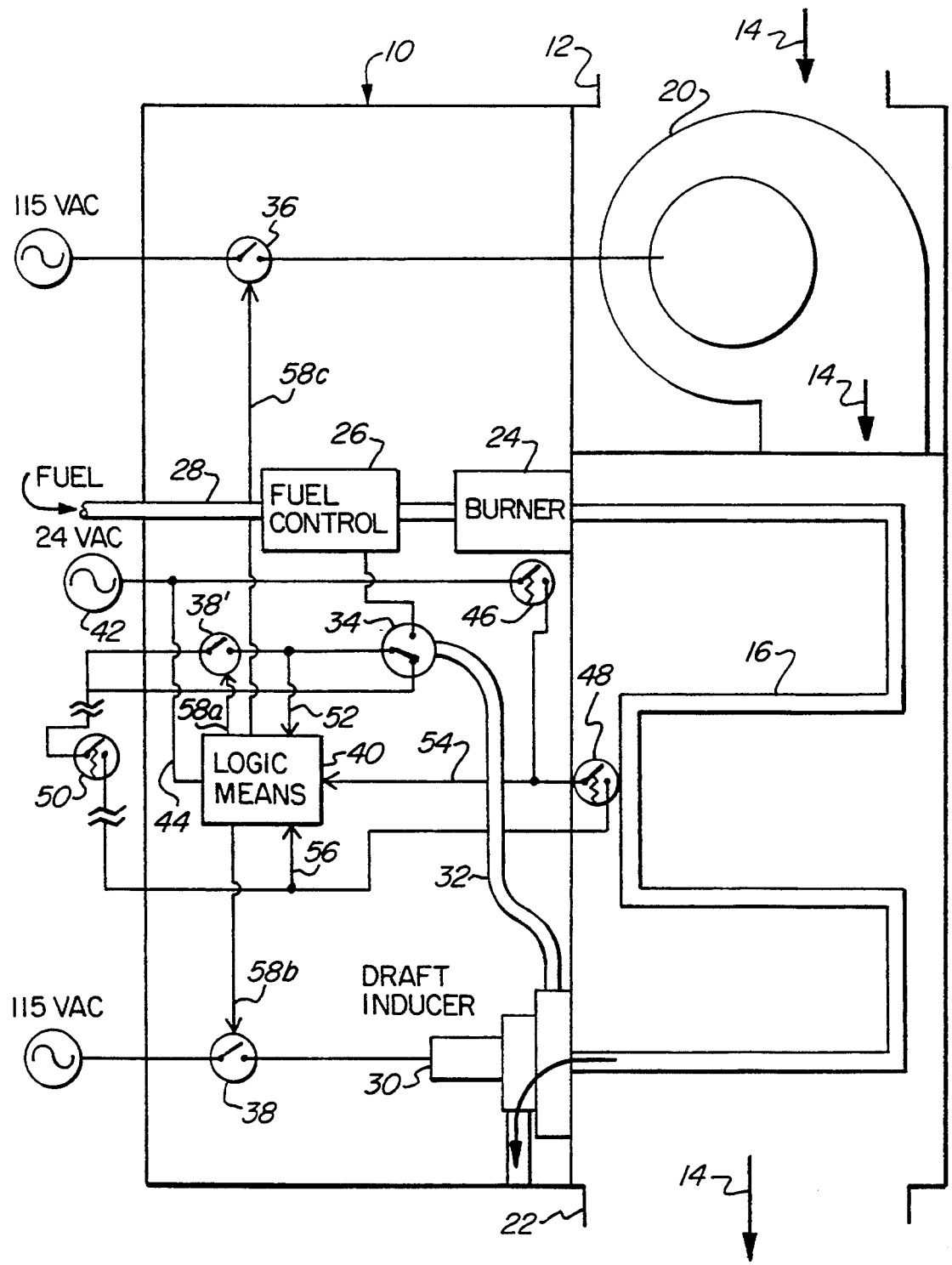
FIG. 1 is a schematic diagram of a conventional downflow, forced air furnace in accordance with a preferred embodiment of the present invention.

There is shown in FIG. 1 a furnace 10 having an air inlet 12 through which return air enters the furnace. The furnace defines a flow path indicated by flow arrows 14, into which heat exchanger 16 is disposed. A blower 20 situated in the flow path to force return air into the furnace, past the heat exchanger and out the furnace air outlet 22.

The heat exchanger is heated by a burner unit 24 which receives fuel from a fuel control unit 26, which receives fuel via fuel line 28 and electrical power through pressure switch 34. Combustion products are drawn through heat exchanger 16 by draft inducer 30. A pressure line 32 runs from draft inducer 30 to a pressure switch 34 that operates fuel control unit 26. Pressure switch 34 has two positions: an OFF position in which power is cut off from fuel control unit 26 but in which a connection is made between logic means 40 and an external thermostat 50 via signal line 52, and an ON position in which power is supplied to fuel control unit 26 via thermostat 50 and other switches, as described below. Blower 20 and draft inducer 30 are both powered by conventional household current, e.g., 115 Volts AC through blower switch 36 and inducer switch 38, respectively.

In accordance with the present invention, furnace 10 comprises a logic means 40 which controls the operation of blower 20, fuel control unit 26 and draft inducer 38. Logic means 40 powered by a suitable power source 42, e.g., 24 volts AC, by means of a power input line 44. Logic means 40 is responsive to several switches that reflect the operating conditions of furnace 10, i.e., burner limit switch 46, primary limit switch 48, pressure switch 34 and an external thermostat 50, which is located in the area to be heated. These controlling switches may be powered by power source 42.

In normal operation, when starting from a cold furnace, burner limit switch 46 and primary limit switch 48 are closed, pressure switch 34 is OFF and external thermostat 50 is open. Therefore, while external thermostat 50 remains open, it breaks the electrical connection between power source 42 and the stepped-down demand sensor line 52 to logic means 40. When the external thermostat 50 cools and closes its switch, a circuit running from power source 42 through burner limit switch 46, primary limit switch 48, thermostat 50 and pressure switch 34 is closed, sending a demand signal via signal line 52 to logic means 40. Logic means 40 then closes inducer switch 38 and fuel control unit lockout switch 38' to start draft inducer 30 and to permit the operation of fuel control unit 26. When pressure switch 34 senses, via pressure line 32, that an appropriate draft has been created in heat exchanger 16, pressure switch 34 switches so that power is sent to fuel control unit 26, which provides fuel to burner unit 24 to heat heat exchanger 16. After a delay in time sufficient to allow burner 24 to heat up heat exchanger 16, logic means 40 closes blower switch 36 to operate blower 20, thus forcing air through the air path to be heated by heat exchanger 16.

Primary limit switch 48 is mounted in the enclosure housing and is designed to open in the event that the temperature of the air in the air flow path exceeds a designated upper limit. Typically, primary limit switch 48 is mounted on or in near proximity to heat exchanger 16, and is typically designed to open if the air around the heat exchanger reaches a temperature of about 180° F., toward compliance with applicable safety regulations such as ANSI Z21.47a referred to above. Should primary limit switch 48 open, the circuit from power source 42 to fuel control unit 26 will be broken, shutting off fuel to the furnace to allow it to cool until the open primary limit switch 48 closes again.

Logic means 40 senses the opening of primary limit switch 48 through step-down sensing line 56. Logic means 40 is programmed to respond to a shutdown caused by primary limit switch 48 by starting a timer. Logic means 40 measures the time period during which primary limit switch 48 is open, which time period is referred to herein as the shutdown period. If primary limit switch 48 closes within a predetermined time referred to herein as a reference interval, i.e., if the shutdown period is short, logic means 40 allows the furnace to operate normally. In such case, the restoration of the power from power source 42 to pressure switch 34 will cause logic means 40 to initiate draft inducer 30, and subsequently, fuel control unit 26, burner unit 24 and blower 20, as described above.

According to one embodiment of the present invention, the logic means may simply comprise a timer control means, and if the shutdown period exceeds the reference interval, i.e., if the shutdown period is prolonged, the timer control means will lock out the operation of fuel control unit 26 by opening lockout switch 38', which renders fuel control unit 26 inoperable.

According to another embodiment of the present invention, the logic means is programmed to allow a certain number of prolonged shutdowns to occur or cycle before locking out the operation of the furnace. Thus, if the shutdown period exceeds the reference interval, i.e., if the shutdown period is prolonged, logic means 40 checks whether a predetermined number of consecutive prolonged shutdowns has occurred. If not, the furnace is allowed to restart when primary limit switch 48 closes. Logic means 40 is programmed so that upon the occurrence of a predetermined number or cycle count limit of consecutive prolonged shutdowns it will lock out the operation of fuel control unit 26 by opening lockout switch 38'. Logic means 40 will also turn off draft inducer 30 and blower 20 by opening switches 38 and 36, respectively. Switches 38 and 38' may be incorporated in a single switching mechanism for simultaneous control of draft inducer 30 and fuel control unit 26. Logic means 40 will continue to prevent further operation of furnace 10 until the unit is restarted, preferably after the furnace has been serviced. In a typical embodiment, logic means 40 will be equipped with power-on reset circuitry, so that the timer and the counter will be reset to zero by disconnecting and then re-connecting power source 42 to logic means 40. For example, there may be a manually operable switch in power line 44 which service personnel may actuate to reset logic means 40 after furnace 10 has been serviced.

Figure 2:
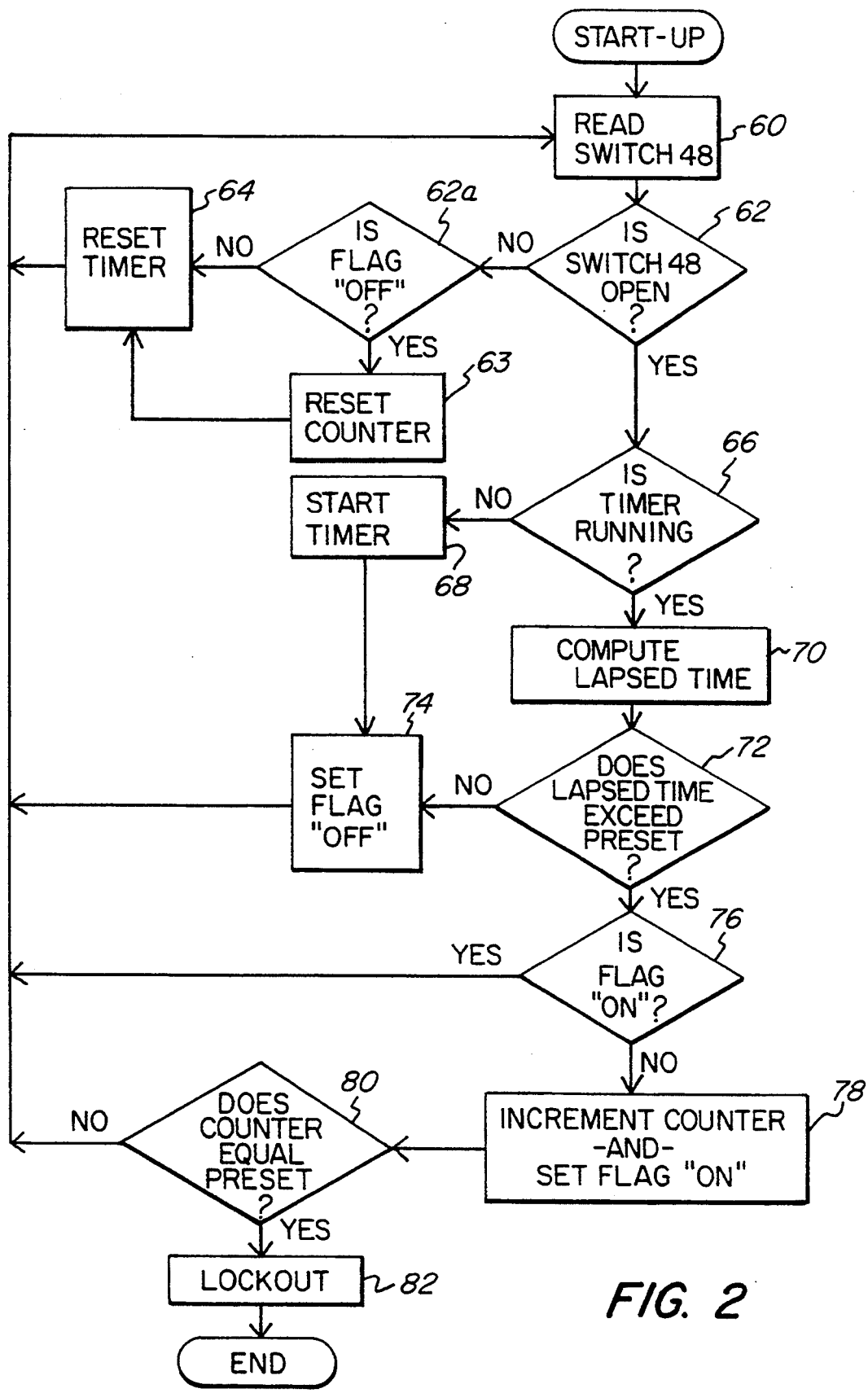
FIG. 2 is a logic flow diagram of the logic control operation of the furnace described in FIG. 1.

A suitable logic diagram for the operation of logic means 40 according to one embodiment of the invention is shown in FIG. 2. Upon start up, the system is initialized by setting the timer to zero, setting the flag described below to OFF, and setting the counter to zero. Then, logic means 40 proceeds to step 60, in which it reads the open or closed state of primary limit switch 48 via step-down sensing line 56. If it is determined in step 62 that primary limit switch 48 is not open, i.e., the temperature on heat exchanger 16 is not excessive, a logic flag, is checked in step 62a. As referred to herein, a "flag" is an arbitrary variable used in logic processes that serve as a record of whether a particular condition exists. In the present invention, the flag is used in step to 62a to indicate whether the previous shutdown, if any, was a prolonged shutdown; "OFF" indicating that it was not. If the flag is OFF, the counter, which is used to keep count of consecutive prolonged shutdowns, is reset to zero in step 63 and the timer is reset in step 64. If the flag was ON, i.e., if the immediately preceeding shutdown was a prolonged shutdown, the counter is not reset.

In the event that primary limit switch 48 opens, logic means 40 proceeds from step 62 to step 66 to check the status of the timer. If the timer has not yet been started, it is started in step 68. If the timer has been started, the elapsed time is computed in step 70 and the computed lapsed time, i.e., the shutdown period, is compared in step 72 to a predetermined reference interval referred to in the diagram as "preset". If either the timer had to be started in step 68 or if the lapsed time does not exceed the preset reference interval as checked in step 72, the flag is set OFF pursuant to step 74, and the logic cycle repeats, following steps 60, 62, 65, 66, 70, 72. As long as the shutdown period is not prolonged, step 74 keeps the flag OFF. If the primary limit switch 48 closes again before the shutdown period becomes prolonged, i.e., if the shutdown period is short, the flag will remain OFF, and the counter will be reset in step 63. This means that even if there was a previous prolonged shutdown that turned the flag ON and started the counter as described below, a subsequent short shutdown period turns the flag OFF and re-starts the counter.

If a shutdown period exceeds the preset reference interval, step 72 instructs logic means 40 to check the flag in step 76, rather than turn the flag OFF in step 74. When the shutdown period first exceeds the preset reference interval, the flag is OFF, so logic means 40 proceeds to step 78, and turns the flag ON to indicate that the shutdown period is prolonged, and increments the counter. The counter is then checked in step 80, to see whether it has attained a predetermined cycle count limit. If not, the logic cycle repeats through steps 60, 62, 65, 66, 70, 72, which continues to instruct logic means 40 to check the flag in step 76 rather than turn the flag OFF in step 74. Once the flag is ON, step 76 causes the cycle to repeat until limit switch 48 closes. In this case, the prolonged shutdown is evident because the flag is ON, so when primary limit switch 48 closes, step 62a will not proceed to step 63 to reset the counter. Thus, the counter has been incremented to reflect a prolonged shutdown cycle. In a subsequent shutdown, the flag will at first be turned OFF in step 74 as described above, and if the shutdown is short, the flag will remain OFF and the counter will be reset in step 63 when primary limit switch 48 closes. If, however, the subsequent shutdown is prolonged, step 72 will again lead to step 78, turning the flag ON and again incrementing the counter. If consecutive prolonged shutdowns cause the counter to attain the preset cycle count limit, logic means 40 will lock out the operation of the furnace in step 82, e.g., by opening a lockout switch. The operation of the furnace ends in step 84, pending restart by service personnel.

It will be understood from the above that by checking whether the flag is ON in step 76, logic means 40 is, in effect, checking to see whether the counter has already been incremented for the current prolonged shutdown, since the counter is incremented when the flag is initially turned ON in step 78. Step 76 thus prevents the repetition of steps 78 and 80 during a prolonged shutdown and assures that a prolonged shutdown is counted only once.

Logic means 40 may be programmed with any desireable preset reference interval and preset limit of consecutive prolonged shutdown numbers. For example, in a preferred embodiment, the preset reference interval was set for 150 seconds, and the preset limit of the number of consecutive prolonged shutdowns was set at three. Optionally, logic means 40 may be programmable on site, and for this purpose may comprise programming means such as a data entry port.

While the invention has been described with reference to particular embodiments thereof, it will be appreciated that numerous variations to the described embodiments will occur to those skilled in the art once given the present disclosure, and such embodiments are intended to be within the scope of the appended claims.

What is claimed is:

1. In a control system for a heating furnace of the type comprising an enclosure housing defining an air path, a blower for forcing air to be heated through the air path, a heat exchanger in the air path, a burner for combusting fuel to supply heat to the heat exchanger and a fuel control unit for controlling the flow of fuel to the burner, the improvement comprising:

a primary limit switch in the enclosure housing having a closed or ON state for allowing the furnace to operate and an open or OFF state for shutting down the furnace for a shutdown period, and being normally ON and being capable of switching from ON to OFF when the temperature in the enclosure housing exceeds a predetermined level;

a timer control means responsive to the limit switch and comprising a timer for measuring the shutdown period and for comparing the shutdown period to a predetermined reference interval, and for opening at least one lockout switch for locking out the operation of the furnace if the shutdown period exceeds the reference interval;

wherein at least the fuel control unit is not operable when the at least one lockout switch is open.

2. The control system of claim 1 wherein the timer control means is electrically powered and comprises a power on-reset means so that the timer is reset to zero when the power to the timer control means is shut off and then restored.

3. In a control system for a heating furnace of the type comprising an enclosure housing defining an air path, a blower for forcing air to be heated through the air path, a heat exchanger in the air path, a burner for combusting fuel to supply heat to the heat exchanger and a fuel control unit for controlling the flow of fuel to the burner, the improvement comprising:

a primary limit switch in the enclosure housing having a closed or ON state for allowing the furnace to operate and an open or OFF state for shutting down the furnace for a shutdown period, and being normally ON and being capable of switching from ON to OFF when the temperature in the enclosure housing exceeds a predetermined level;

an electrically powered logic control means responsive to the limit switch and comprising a timer means for measuring the shutdown period and for comparing the shutdown period to a predetermined reference interval, and further comprising counting means for counting the number of consecutive prolonged shutdowns, and for comparing the counted number to a predetermined cycle count limit, and for opening at least one lockout switch for locking out the operation of the furnace if the counted number reaches the predetermined cycle count limit;

wherein at least the fuel control unit is not operable when the at least one lockout switch is open.

4. The control system of claim 3 wherein the logic control means comprises a power on-reset means so that the timing means and the counting means are reset to zero when the power to the logic control means is shut off and then restored.

5. A control system according to claim 1, claim 2, claim 3 or claim 4 wherein the primary limit switch is located on or in close proximity to the heat exchanger.

6. A control system according to claim 1, claim 2, claim 3 or claim 4 wherein the logic control means comprises a microprocessor.

7. The control system according to claim 3 or claim 4 wherein the logic control means further comprises memory means for storing the predetermined reference interval and the predetermined cycle count limit.

8. A method for limiting the operation of a furnace of the type comprising an enclosure housing defining an air path, a blower for forcing air to be heated through the air path, a heat exchanger in the air path, a burner for combusting fuel to supply heat to the heat exchanger and a fuel control unit for controlling the flow of fuel to the burner, the operation of which furnace includes responding to a demand signal from an external thermostat by running a draft inducer for the heat exchanger supplying fuel to the burner via the fuel control unit and operating the burner to heat the heat exchanger and running the blower means to blow air to be heated over the heat exchanger, the method for limiting the operation comprising the steps of:

a) shutting down the furnace when the temperature of the air in the enclosure housing exceeds a reference temperature;

b) (i) measuring the shutdown period, and (ii) comparing the shutdown period to a predetermined reference interval; and c) locking out the operation of the furnace if the shutdown period is prolonged with respect to the reference interval.

9. A method for limiting the operation of a furnace of the type comprising an enclosure housing defining an air path, a blower for forcing air to be heated through the air path, a heat exchanger in the air path, a burner for combusting fuel to supply heat to the heat exchanger and a fuel control unit for controlling the flow of fuel to the burner, the operation of which furnace includes responding to a demand signal from an external thermostat by running a draft inducer for the heat exchanger supplying fuel to the burner via the fuel control unit and operating the burner to heat the heat exchanger and running the blower means to blow air to be heated over the heat exchanger, the method for limiting the operation comprising the steps of:

a) shutting down the furnace when the temperature of the air in the enclosure housing exceeds a reference temperature;

b) (i) measuring the shutdown period, and (ii) comparing the shutdown period to a predetermined reference interval; and c) either (i) locking out the operation of the furnace if the shutdown period is prolonged with respect to the reference interval and if the furnace has attained a predetermined cycle count limit of consecutive prolonged shutdown periods, or (ii) allowing the furnace to resume operation when the temperature of the air near the heat exchanger falls below the reference temperature, and either incrementing a counter if the shutdown was prolonged or restarting the counter if the shutdown was short.

10. A method according to claim 8 or claim 9 wherein steps (b) and (c) are accomplished by means of a microprocessor.

11. A method according to claim 8 or claim 9 wherein step (a) comprises measuring the temperature in the enclosure housing at a location in close proximity to the heat exchanger.

* * * * *

UNITED STATES PATENT AND TRADEMARK OFFICE
CERTIFICATE OF CORRECTION

PATENT NO. : 5,377,909
DATED : January 3, 1995
INVENTOR(S) : Michael E. Kirkpatrick It is certified that error appears in the above-indentified patent and that said Letters Patent is hereby corrected as shown below:

```
In column 1, line 31, replace "exchange::" with --exchanger;--.

In column 2, line 4, after "described by" insert --the--.
In column 2, line 34, replace "are" with --is--.

In column 4, line 5, replace "in" with --is--;

In column 5, line 6, replace "lockout" with --lock out--.
In column 5, line 18, between "20" and "situated" insert --is--.

In column 5, line 41, between "40" and "powered" insert --is--.
In column 5, line 55, replace "demand sensor" with --signal--.

In column 6, line 1, insert --unit-- between "burner" and "24".
In column 6, line 63, replace "power-on reset" with
                      --power-on-reset--.

In column 7, line 14, delete "to".
In column 7, line 20, replace "preceeding' with --preceding--.
In column 7, line 33, replace "set OFF" to --set to OFF--.
In column 7, in lines 34 and 54, delete each instance of "65".
```

Signed and Sealed this

Seventeenth Day of October, 1995

*Attest:*

BRUCE LEHMAN

*Attesting Officer*     *Commissioner of Patents and Trademarks*